Oct. 9, 1951 J. R. FELLABAUM 2,570,536
REMOTELY ADJUSTABLE REARVIEW MIRROR
Filed Sept. 9, 1949 2 Sheets-Sheet 1
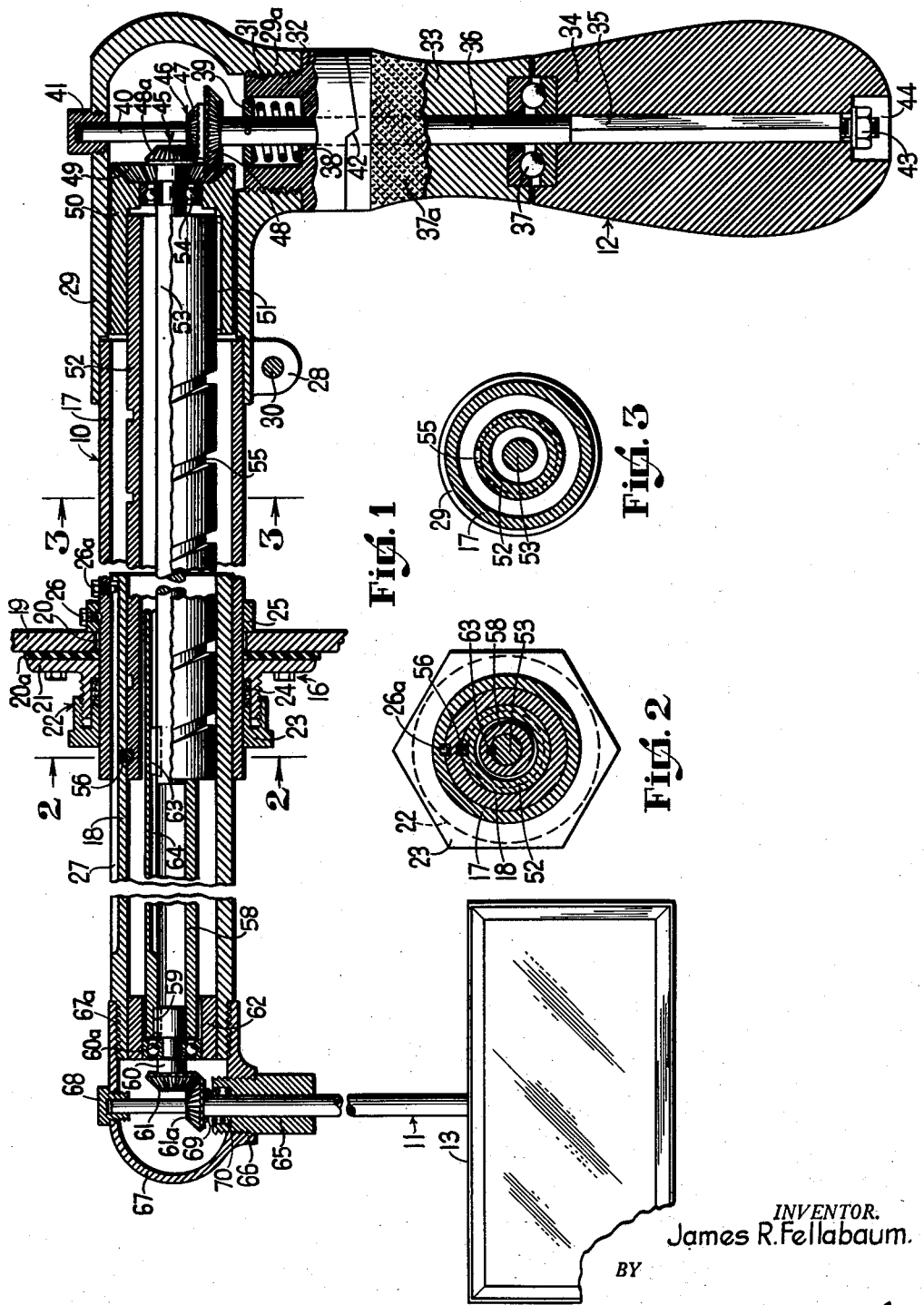
INVENTOR.
James R. Fellabaum.
BY
ATTORNEYS Oct. 9, 1951     J. R. FELLABAUM     2,570,536
REMOTELY ADJUSTABLE REARVIEW MIRROR
Filed Sept. 9, 1949     2 Sheets-Sheet 2

*INVENTOR.*
James R. Fellabaum.
BY
*ATTORNEYS*

Patented Oct. 9, 1951

2,570,536

UNITED STATES PATENT OFFICE 2,570,536

REMOTELY ADJUSTABLE REARVIEW MIRROR

James R. Fellabaum, Marion, Ohio

Application September 9, 1949, Serial No. 114,793

10 Claims. (Cl. 248—279)

My invention relates to a remotely adjustable rear view mirror. It has to do, more particularly, with a rear vision mirror which is especially suitable for use on trucks or busses, since it is adjustable from a remote point, but which is not limited to use on such vehicles.

At the present time, the rear-view mirrors commonly in use on trucks or busses can only be adjusted from points outside the cabs of such vehicles. For example, on a tractor of a tractor-trailer combination, the rear-view mirror is usually supported on a fixed arm attached to the cab, the arm extending outwardly about two feet so that the mirror is positioned laterally beyond the trailer. It is difficult for the driver to reach out the left-hand side of the cab and accurately adjust the mirror since it will not be in proper position when he again sits back in the driver's seat. The same is even more true if such a mirror is provided at the right-hand side. Therefore, it is usually necessary for the driver to sit in his seat and have another person stand outside and adjust the mirror in accordance with the driver's instructions. Furthermore, when the tractor is being driven alone, it is both unnecessary and undesirable for the mirror support to extend outwardly to the positon it occupies when the trailer is attached.

It is the main object of my invention to provide a rear view mirror which is particularly useful in busses or trucks, which includes a supporting arm mounted on the cab to position the mirror outside the cab, and which also includes mechanism for accurately adjusting the mirror by the driver from a point within the cab, the adjustment including movement inwardly and outwardly relative to the cab, tilting movement about a horizontal axis, and pivoting movement about a vertical axis.

Another object of my invention is to provide a rear view mirror of the type indicated wherein the three types of adjustments can be accomplished quickly and with ease by the use of one hand only.

A further object of my invention is to provide a structure of the type indicated of such a nature that after the mirror is adjusted, it will be held in such adjusted position until it is again adjusted by positive movement of the adjusting mechanism by the driver.

Another object of my invention is to provide a remotely adjustable rear view mirror of the type indicated wherein the adjusting mechanism is simple but positive in action, and is completely enclosed for protection.

Various other objects will be apparent.

According to my invention, I provide a rear view mirror which includes the mirror itself that is carried on the outer end of a supporting tube which is mounted on the cab or body of the vehicle. This tube is provided with a pistol type handle at its inner end by means of which the mirror can be adjusted with one hand. The mirror is carried on a radially extending arm at the outer end of the supporting tube and the tube is rotatably mounted in a bearing in the wall of the cab. By swinging the handle, the tube may be rotated to swing the mirror-supporting arm about the axis of the tube so as to adjust the mirror about a longitudinal axis. The supporting tube includes telescoping sections which can be extended or retracted to move the mirror in or out relative to the cab merely by operating the suitable feed-screw mechanism in the supporting tube. Furthermore, I provide telescoping shaft mechanism within the supporting tube which is connected to the radially extending mirror-supporting arm in such a manner that when it is rotated, the arm rotates about its own axis and adjusts the mirror about such axis. A suitable clutch is provided for selectively actuating either the feed-screw mechanism for extending or withdrawing the telescoping sections of the tube or for rotating the shaft mechanism which rotates the radially extending arm. The control means for this clutch comprises a rotatable section of the handle which will select either mechanism so that by rotating the main section of the handle the selected mechanism will be actuated. Thus, the three adjustments of the mirror can be accomplished by grasping the handle with one hand.

The preferred embodiment of my invention is illustrated in the accompanying drawings wherein similar characters of reference designate corresponding parts and wherein:

Figure 1 is a view mainly in longitudinal section of a rear view mirror and support according to my invention.

Figure 2 is a transverse section taken on line 2—2 of Figure 1.

Figure 3 is a transverse section taken on line 3—3 of Figure 1.

Figure 4:
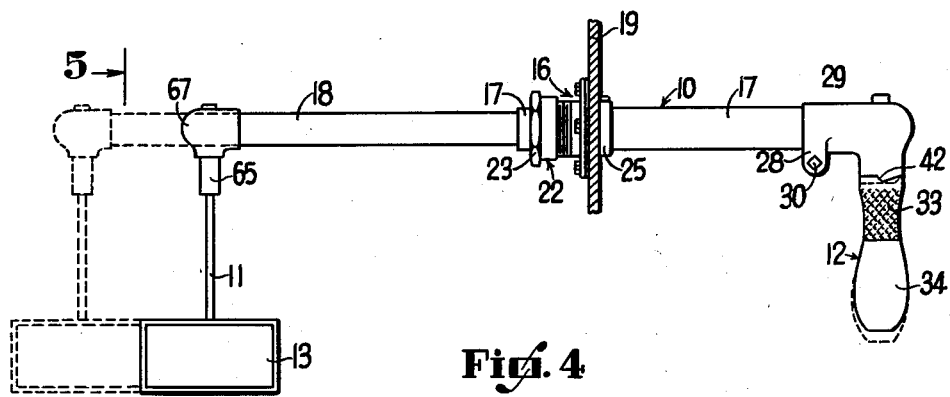
Figure 4 is a diagrammatic view illustrating how the mirror support can be extended or withdrawn to adjust the position of the mirror laterally of the truck.

With reference to the drawings, my rear view mirror and supporting structure comprises mainly a telescoping supporting tube 10 (Figure 1) having a radially extending mirror-carrying arm 11 on its outer end and a radially extending handle 12 on its inner end. The arm 11 carries on its outer end a mirror 13 of any suitable type which may be mounted on a laterally extending portion 14 (Figure 5) thereof by means of the usual ball and socket type joint 15.

Figure 5:
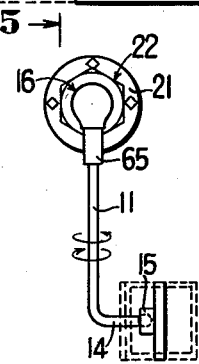
Figure 5 is a diagrammatic view illustrating how the mirror can be adjusted about a vertical axis.
Figure 6:
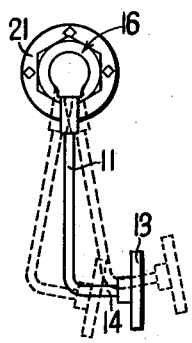
Figure 6 is a similar view illustrating how the mirror can be adjusted about a horizontal axis.
Figure 7:
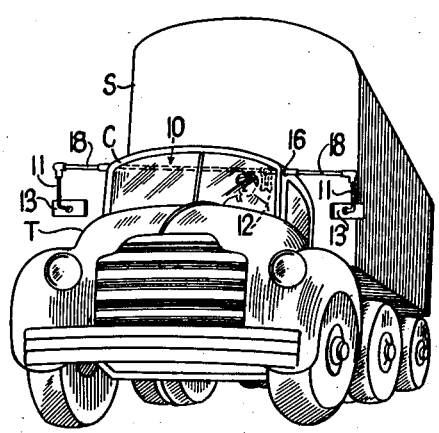
Figure 7 is a diagrammatic view showing two of the mirrors mounted on the cab of the tractor of a tractor-trailer combination.

In Figure 7, I have illustrated one application of my mirror and supporting structure. In this instance, two of the mirrors are mounted on the cab C of the tractor T which pulls the semi-trailer S. With a tractor-trailer combination of this type, it is desirable to have a rear view mirror on each side. In the arrangement indicated, the tubes 10 are mounted rotatably in bearings 16 carried by each side wall of the cab adjacent the top thereof. One of the tubes 10, that is, the one at the right of the cab, will be longer than the other so that both handles 12 will be close to the driver. With this arrangement, both of the mirrors can be controlled from the driver's seat. As previously indicated, it will be possible with my structure to move the mirror 13 laterally, as shown in Figure 4, to adjust it about the axis of the arm 11, as shown in Figure 5, or to adjust it about the axis of the tube 10, as shown in Figure 6.

The telescoping tube 10 comprises an outer tube section 17 within which an inner tube section 18 slides. As previously indicated, a bearing 16 is associated with the wall 19 of the cab. This wall 19 has an opening 20 and the bearing 16 surrounds the opening, there being a sealing gasket 20a between the flange 21 of the bearing 16 and the wall 19. The tube 17 fits rotatably but tightly within the bearing 16 and a packing gland 22 is formed on the bearing. This gland 22 has a nut 23 associated therewith by means of which the packing 24 may be caused to more firmly engage the outer surface of the tube 17. A collar 25 surrounds tube 17 inside wall 19 and is fixed thereon by a screw 26 so that it will rotate with tube 17. The tube 17 will rotate in the bearing 16 and whenever necessary the packing gland can be tightened to maintain sufficient friction on the tube 17 to keep it in any position to which it is rotated by swinging the handle 12. Obviously, the gland 22 and gasket 20a will serve to provide a watertight connection to prevent leakage into the cab through opening 20.

The section 18 is splined to the outer section 17 by means of a key which is provided by the inner end of screw 26a and which fits into a spline groove 27 formed in the outer surface of member 18 and having both ends closed. Thus, these members can slide relatively to each other but will not rotate relative to each other. The inner end of the tube 17 has clamped thereon by means of a split clamp 28, a sleeve 29 which is part of the handle 12. The clamp includes a removable bolt 30 which permits removal of the handle 12 from the tube 17 if necessary.

The sleeve 29 is provided with a depending interiorly threaded socket 29a on its inner end which receives the upstanding threaded portion 31 on a collar 32. The part of the handle to be gripped by the hand comprises an upper clutch-actuating section 33 and a lower main operating section 34. The section 34 is mounted on an angular portion 35 of a shaft 36, which extends radially from sleeve 29 through the member 32, so that it can be used in rotating the shaft. The section 34 is always free to rotate relative to section 33, being separated therefrom by a ball-bearing 37 of the thrust type.

The section 33 is rotatably mounted on the circular part of the shaft 36 and is knurled, as indicated at 37a, to facilitate rotation thereof relative to section 34 and collar 32. The shaft 36 is slidably mounted in the collar 32 and is normally maintained in retracted position by means of a compression spring 38 which is disposed within portion 31 of collar 32 and which engages a collar 39 fixed to the shaft 36. The extreme inner end of the shaft is reduced, as at 40, and is rotatably carried in a bearing cup 41 which is threaded into an opening in the wall of sleeve portion 29 in axial alignment with collar 32. The outer edge of collar 32 contacts with the inner edge of handle section 33 and these contacting edges are shaped to form two cooperating cam edges which normally interlock and interfit, as indicated at 42. A nut 43 threaded on the outer end of shaft 36 and fitting in a socket 44 in handle section 34 keeps the handle sections 33 and 34 in association with each other and section 33 engaged with collar 32. When handle section 33 is rotated relative to handle section 34 and collar 32, the cam edges ride upon each other, as indicated diagrammatically in Figure 4, and serve to move the handle sections 33 and 34 radially outwardly pulling the shaft 36 therewith against the force of spring 38. However, the extreme inner end of the shaft will still be positioned within the bearing 41. Furthermore, the handle section 34 will still be permitted to rotate relative to section 33, this being facilitated by the bearing 37.

This handle arrangement is provided for selectively actuating the clutch enclosed within sleeve portion 29 and indicated generally by numeral 45. This clutch comprises a double gear 46 keyed on shaft 36 and including an inwardly facing bevel portion 47 and an outwardly bevel portion 48. With the handle in the position indicated in Figure 1, the bevel portion 47 engages a bevel gear 48a. With the shaft 36 pulled outwardly by rotation of section 33, the bevel portion 48 will engage an interior bevel gear portion 49 formed on the inner end of a sleeve 50. This sleeve 50 is rotatably mounted within sleeve portion 29 and is keyed by a key arrangement 51 to a screw sleeve 52. The bevel gear 48a is keyed on the inner end of a shaft section 53 which has its inner end rotatably mounted, by means of a ballbearing 54, in the sleeve 50.

The sleeve 52 is provided with a helical or screw groove 55 formed in its exterior surface and extending substantially the full length thereof with its outer end open. The outer portion of this screw sleeve 52 extends within the inner end of tube 18 which forms a part of the telescoping tube 10. This tube 18 is provided on its inner surface with inwardly extending projections 56 which fit into the helical groove 55. Obviously, when sleeve 52 is rotated by means of gear 49, the tube 18 will move in or out of the tube 17, depending upon the direction of rotation of gear 49, due to cooperation or projections 56 with groove 55. The inner end of the spline groove 27 in tube 18 in cooperation with the key formed on the inner end of screw 26a prevents complete movement of the tube 18 out of the tube 17.

However, screw 26a may be withdrawn from groove 27 to permit removal of tube 18.

As previously indicated, gear 48a drives shaft section 53. This shaft section is part of a telescoping shaft which serves to rotate the radially extending arm 11. The shaft section 53 has its outer end slidably fitting into a tubular shaft section 58. This shaft section 58 has its outer end keyed by a key arrangement 59 to a stub shaft 60 which is received within tubular shaft 58. This stub shaft 60 is rotatably mounted in a ball bearing 60a carried by a collar 62 secured within the outer end of tube 18. The shaft section 53 is splined within the tubular section 58 by means of a key 63 carried by section 53 and extending outwardly into a spline groove 64 formed in the inner surface of outer shaft 58. Thus, the shaft sections 53 and 58 will not rotate relative to each other but are free to move axially relative to each other.

When the shaft 53 is rotated by gear 48a, it will rotate the stub shaft 60. This stub shaft 60 carries a bevel gear 61 which meshes with a bevel gear 61a. The gear 61a is keyed on the inner end of the mirror-carrying arm 11. The arm 11 is rotatably carried in a bearing sleeve 65 which is threaded radially into a socket 66 formed in a cap 67 which is threaded at 67a on the outer end of the tube 18. The extreme inner end of the arm 11 is reduced and is rotatably and slidably mounted in a bearing provided on a bearing cap 68 which is threaded radially into cap 67 in axial alignment with tubular bearing 65. A compression spring 69 is provided within a socket 70 formed at the inner end of member 65 and bears against gear 61a to keep it in engagement with gear 61.

It will be apparent that with this arrangement, three adjustments of the mirror 13 are possible merely by actuating the handle 12 with one hand. One of the adjustments is indicated in Figure 6 and can be accomplished merely by grasping the handle 12 and swinging it bodily to rotate the supporting tube 10 in the bearing 16. Due to the spline and groove connection between sections 17 and 18 of this tube, the arm 11 will be swung about the axis of the tube, as indicated in Figure 6. With the handle in the condition illustrated in Figure 1, that is, with section 33 interfitting and interlocking with collar 32, if the section 34 of the handle is rotated, the telescoping shaft 53—58 will be rotated since bevel portion 47 of the clutch is in engagement with pinion 48a. Rotation of the telescoping shaft will rotate the arm 11 about its axis and move the mirror 13 in the manner illustrated in Figure 5. The other adjustment is to move the mirror 13 towards or away from the handle 12, as illustrated in Figure 4. This is accomplished by rotating the handle section 33 relative to collar 32 and section 34 to move the bevel portion 48 of the clutch into engagement with the interior bevel gear 49. Now rotation of handle section 34 will rotate the screw sleeve 52 and move the tube 18 in or out of the tube 17 along with shaft 58 relative to shaft 53. After each of these adjustments, the mirror will be locked automatically.

It will be apparent from the above description that I have provided a rear view mirror and supporting structure which is particularly useful on trucks or busses or other installations where it is desired to control the positioning of the mirror from a remote location. The three indicated adjustments of the mirror may be accomplished with ease from the driver's seat. The device is relatively simple, positive in action, and can be operated with one hand which is a safety factor. All of the actuating mechanism is enclosed and protected. Furthermore, the parts may be readily disassembled for servicing.

Various other advantages will be apparent.

Having thus described my invention, what I claim is:

1. A rear view mirror comprising a main supporting arm mounted for rotation about its own axis, a radially extending mirror-carrying arm on the outer end of said supporting arm, a handle on the inner end of said main supporting arm by means of which it may be rotated about its own axis, said main supporting arm being composed of telescoping sections, mechanism for extending or withdrawing said sections, mechanism carried by said main supporting arm for rotating said mirror-carrying arm about its axis, a clutch for selectively actuating either of said mechanisms, said handle being composed of a plurality of relatively movable sections, one of said sections serving to control the clutch upon proper movement thereof and the other of said sections serving upon movement thereof to actuate the selected mechanism.

2. A rear view mirror comprising a supporting tube mounted for rotation in a bearing carried by a support, a radially extending mirror-carrying arm rotatably mounted in a bearing on the outer end of said tube, a radially extending handle fixed on the inner end of said tube so that swinging of the handle will rotate said tube in its bearing, said tube being composed of telescoping sections, screw mechanism within said sections for extending or withdrawing said sections, a telescoping shaft rotatably mounted within said tube and connected to said radially extending arm for rotation thereof, a clutch for selectively driving said screw mechanism or said shaft, said handle comprising relatively rotatable sections which are axially aligned, one of said handle sections serving to control the clutch upon rotation of said section to drive the screw mechanism or to drive the shaft and the other of said handle sections serving upon rotation thereof to rotate the selected mechanism.

3. A rear view mirror comprising a supporting tube mounted for rotation in a bearing carried by the support, means for preventing longitudinal movement of the tube in said bearing, a radially extending mirror-carrying arm rotatably mounted in a bearing on the outer end of said tube, a radially extending handle clamped on the inner end of said tube so that swinging of the handle will rotate said tube in its bearing, said tube being composed of a pair of telescoping sections splined together, a screw sleeve disposed within the inner of said sections and mounted for rotation relative thereto, said sleeve being provided with a helical groove engaged by a projection on the outer of said sections, a shaft composed of a pair of telescoping sections, the inner of said shaft sections having its inner end rotatably connected to said screw sleeve and the outer of said shaft sections having its outer end rotatably connected to said outer tube section, a gear carried by the inner end of said screw sleeve and a gear carried by the inner end of said inner telescoping shaft section, a shaft rotatably mounted in said handle, a gear clutch carried by said shaft and having a portion for engaging the gear on the screw sleeve and a portion for engaging the gear on the telescoping shaft section, said handle comprising a main section keyed to said shaft in the handle by means of which said shaft may be rotated, and a relatively rotatable handle section mounted for rotation on said handle shaft; and a cam associated with said rotatable handle section so that upon rotation thereof the shaft in said handle will be moved axially to move said gear clutch so as to selectively move said gear portions into engagement with the gear carried by the screw sleeve or the gear carried by the telescoping shaft section.

4. A rear view mirror according to claim 3 wherein the bearing is disposed in a wall, and sealing means is provided between the bearing and wall.

5. A rear view mirror according to claim 3 wherein adjustable means is associated with the tube bearing so that the tube will always be tight in the bearing.

6. A rear view mirror according to claim 3 wherein means is provided for limiting the extent of outward movement of said outer tube section.

7. A rear view mirror according to claim 6 wherein said handle comprises a housing section which is clamped to said inner tube section, said housing section enclosing said gear clutch, and a spring associated with said handle shaft for keeping said handle sections together and for normally engaging one of the gear portions of the clutch with the gear carried by said telescoping shaft section.

8. A rear view mirror according to claim 7 wherein said housing section carries a collar which is provided with a cam edge that engages a complemental cam edge on said rotatable handle section, said cam edges being so shaped that when the one handle section is rotated, the handle shaft is moved axially.

9. A structure according to claim 8 wherein the main handle section is fitted on an angular portion of said handle shaft, said shaft being rotatably and slidably mounted in said collar.

10. A structure according to claim 9 wherein an anti-friction thrust bearing is provided between said handle sections.

JAMES R. FELLABAUM.

REFERENCES CITED

The following references are of record in the file of this patent:

UNITED STATES PATENTS

| Number | Name | Date |
|---|---|---|
| 1,711,129 | Sklarek | Apr. 30, 1929 |
| 1,830,355 | Farr | Nov. 3, 1931 |
| 2,326,316 | Allen | Aug. 10, 1943 |
| 2,483,289 | Martin | Sept. 27, 1949 |